(12) United States Patent
Karmon et al.

(10) Patent No.: US 9,326,033 B2
(45) Date of Patent: Apr. 26, 2016

(54) MOVIE DISCOVERY SYSTEM

(75) Inventors: Kfir Karmon, Petach Tikva (IL); Avigad Oron, Tel Aviv (IL); Rotem Bennet, Haifa (IL); Noga Amit-Miller, Magshimim (IL); Adi Diamant, Shoham (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 505 days.

(21) Appl. No.: 13/162,605

(22) Filed: Jun. 17, 2011

(65) Prior Publication Data

US 2012/0324374 A1    Dec. 20, 2012

(51) Int. Cl.
| | |
|---|---|
| G06F 3/048 | (2013.01) |
| H04N 21/475 | (2011.01) |
| H04N 21/25 | (2011.01) |
| H04N 21/258 | (2011.01) |
| H04N 21/442 | (2011.01) |
| H04N 21/658 | (2011.01) |
| G06F 17/30 | (2006.01) |

(52) U.S. Cl.
CPC ...... *H04N 21/4755* (2013.01); *G06F 17/30828* (2013.01); *H04N 21/251* (2013.01); *H04N 21/25891* (2013.01); *H04N 21/44222* (2013.01); *H04N 21/6582* (2013.01)

(58) Field of Classification Search
None
See application file for complete search history.

(56) References Cited

U.S. PATENT DOCUMENTS

| | | | |
|---|---|---|---|
| 7,389,201 | B2 | 6/2008 | Chickering et al. |
| 2002/0056095 | A1* | 5/2002 | Uehara et al. ................ 725/38 |
| 2002/0157095 | A1* | 10/2002 | Masumitsu et al. ............ 725/46 |
| 2002/0178054 | A1* | 11/2002 | Ader ............................... 705/14 |
| 2004/0025180 | A1* | 2/2004 | Begeja et al. ................... 725/46 |
| 2005/0251827 | A1* | 11/2005 | Ellis et al. ........................ 725/47 |
| 2008/0086456 | A1* | 4/2008 | Rasanen et al. ................... 707/3 |
| 2009/0019485 | A1* | 1/2009 | Ellis et al. ....................... 725/40 |
| 2009/0037355 | A1 | 2/2009 | Brave et al. |
| 2009/0077499 | A1* | 3/2009 | Svendsen et al. ............. 715/833 |
| 2009/0100455 | A1* | 4/2009 | Frikker et al. .................. 725/13 |
| 2009/0234784 | A1* | 9/2009 | Buriano et al. ................. 706/12 |
| 2010/0011020 | A1 | 1/2010 | Bouzid et al. |

(Continued)

OTHER PUBLICATIONS

Boim, Rubi, "Methods for Boosting Recommender Systems", Retrieved at <<http://www.cs.tau.ac.il/~boim/publications/icde11-phd-workshop.pdf>>, Proceedings of IEEE 27th International Conference on Data Engineering Workshops (ICDEW), Retrieved date: Mar. 7, 2011, pp. 4.

(Continued)

*Primary Examiner* — Phenuel Salomon
*Assistant Examiner* — Mahelet Shiberou
(74) *Attorney, Agent, or Firm* — Alin Corie; Sandy Swain; Micky Minhas

(57) ABSTRACT

A movie browsing system may use a combination of long term and session based preferences to help a user browse movies using microcategories. The user preferences may be stored as microcategory weights, where the session based weights may change during a session as the system learns the types of movies a user wishes to see at that time. The long term microcategory weights may change at a slower rate than the session weights. The system may present a diverse set of microcategories to a user in an effort to diverge the search and learn the user's current interest, and may refine the weights as the user browses to converge to a desired movie. A user interface may operate on a television screen with a minimum of user input controls to navigate the browsing system while still collecting user preferences.

20 Claims, 4 Drawing Sheets

(56) References Cited

U.S. PATENT DOCUMENTS

| | | | |
|---|---|---|---|
| 2011/0022587 A1* | 1/2011 | Aravamudan et al. | 707/723 |
| 2011/0023063 A1* | 1/2011 | McDonough et al. | 725/46 |
| 2011/0029666 A1* | 2/2011 | Lopatecki et al. | 709/224 |
| 2011/0225608 A1* | 9/2011 | Lopatecki et al. | 725/34 |

OTHER PUBLICATIONS

Gantner, et al., "Factorization Models for Context-/Time-Aware Movie Recommendations", Retrieved at <<http://www.ismll.uni-hildesheim.de/pub/pdfs/Gantner_Rendle_2010_CAMRa.pdf>>, Proceedings of the Workshop on Context-Aware Movie Recommendation, Sep. 30, 2010, pp. 6.

Drenner, et al., "Insert Movie Reference Here: A System to Bridge Conversation and Item-Oriented Web Sites", Retrieved at <<http://citeseerx.ist.psu.edu/viewdoc/download?doi=10.1.1.74.1153&rep=rep1&type=pdf>>, Proceedings of ACM SIGCHI Conference on Human Factors in Computing Systems, Apr. 22-27, 2006, pp. 951-954.

Adomavicius, et al., "Context-Aware Recommender Systems", Retrieved at <<http://ids.csom.umn.edu/faculty/gedas/NSFCareer/CARS-chapter-2010.pdf>>, Proceedings of the 2008 ACM conference on Recommender systems, vol. 16, Retrieved Date: Mar. 7, 2011, pp. 1-37.

"Funnelback", Retrieved at <<http://www.funnelback.com/our-products/features>>, Retrieved Date: Mar. 7, 2011, pp. 2.

"Clerkdogs", Retrieved at <<http://www.clerkdogs.com/about_us>>, Retrieved Date: Mar. 7, 2011, p. 1.

Stern, et al., "Matchbox: Large Scale Online Bayesian Recommendations", Retrieved at <<http://research.microsoft.com/pubs/79460/www09.pdf>>, Proceedings of the 18th international conference on World wide web, Apr. 20-24, 2009, pp. 10.

"IMDB", Retrieved at <<https://secure.imdb.com/signup/index.html?d=IMDbTabNB>>, Retrieved Date: Mar. 7, 2011, p. 1.

"Jinni", Retrieved at <<http://www.jinni.com/about.html>>, Retrieved Date: Mar. 7, 2011, p. 1.

"Netflix", Retrieved at <<http://www.netflix.com/HowItWorks>>, Retrieved Date: Mar. 7, 2011, pp. 2.

* cited by examiner

MOVIE DISCOVERY SYSTEM

BACKGROUND

When browsing for movies, there are thousands of selections but it becomes difficult to find something that a person likes. The frustration brings a person to the point of saying "There is nothing to watch" even though there may be literally thousands of selections.

Some systems use collaborative filtering to present a set of recommended selections based on rankings or other feedback that a user may have given in the past. Such systems are very static and reflect a long term trend for movies that a person has liked in the past. Such systems often can lead to bizarre or unwanted recommendations. For example, an adult who enjoyed a particular animated movie may begin to get recommendations for children's movies that, as an adult, the user may not enjoy.

SUMMARY

A movie browsing system may use a combination of long term and session based preferences to help a user browse movies using microcategories. The user preferences may be stored as microcategory weights, where the session based weights may change during a session as the system learns the types of movies a user wishes to see at that time. The long term microcategory weights may change at a slower rate than the session weights. The system may present a diverse set of microcategories to a user in an effort to diverge the search and learn the user's current interest, and may refine the weights as the user browses to converge to a desired movie. A user interface may operate on a television screen with a minimum of user input controls to navigate the browsing system while still collecting user preferences.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
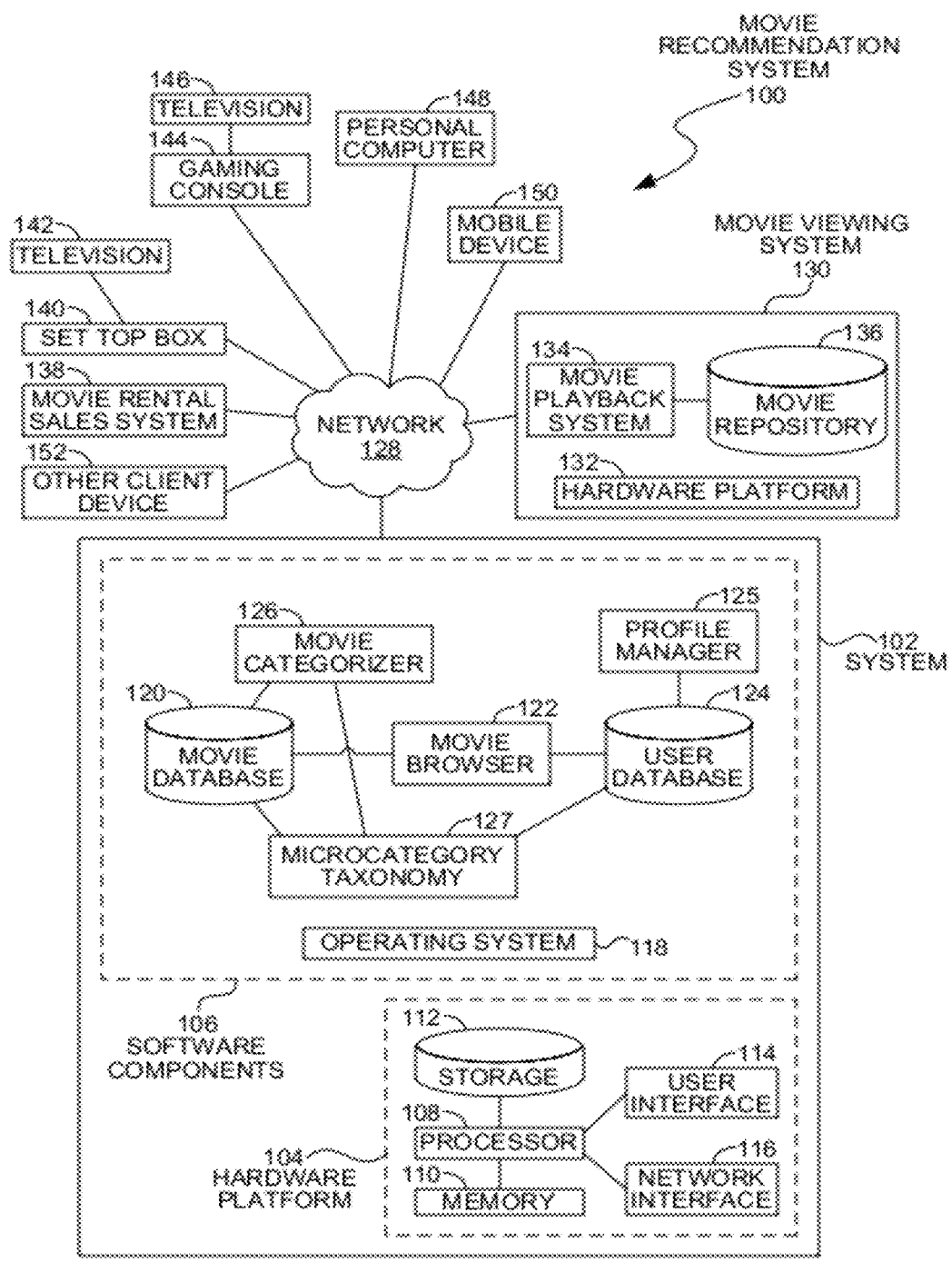
FIG. 1 is a diagram of an embodiment showing a network environment with a movie browsing system.

A movie browsing system may use a movie database categorized using microcategories in an interactive user experience. The movie database may have relatively large numbers of categories, also known as microcategories, assigned for each movie. Each movie may have weights associated with each microcategory indicating the degree to which the movie aligns with the microcategory.

A user database may contain user profiles that include weighted microcategories for each user. For each microcategory, the user's affinity to the microcategory may be defined using a weight.

The movie browsing experience may present several microcategories of movies to the user during a browsing session. The microcategories may be selected as convergent and divergent microcategories. A convergent microcategory may focus a user's selections to more movies that align with the user's current or historical interest. A divergent microcategory may present movies that differ from the user's current or historical interest. By presenting both types of microcategories to the user, a user may browse to movies that they have indicated that they like, as well as browse and explore other genres.

Each movie may be assigned many different microcategories. In some embodiments, a single movie may have three, five, ten, or more microcategories. Some embodiments may have a microcategory in which five, ten, twenty, or one hundred movies may be members. In many embodiments, the number of movies in a given microcategory may be limited to a fixed number. Such embodiments may have many tens, hundreds, or even thousands of microcategories.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100, showing a system for browsing movies. Embodiment 100 is a simplified example of a system that may present an interactive user interface through which a user may browse different movies, which may be purchased or viewed.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

Embodiment 100 illustrates a movie browsing system that uses microcategories to classify and navigate movies. From an interactive user interface, a user may navigate through various microcategories, view movie details, watch movie trailers, and select movies to watch or purchase.

The microcategories may be relatively fine grained categories for which a single movie may be classified into one or more microcategories. In some embodiments, a single movie may be classified into several microcategories. For example, a single movie may be classified into three, five, ten, or even more microcategories.

Some embodiments may include a weighting for each microcategory. The weighting may indicate how closely the movie fits into a microcategory. Such embodiments may give a high weighting to a movie with strong affinity to the microcategory and a low weighting to a movie with a loose affinity to the microcategory.

Similarly, users may have profiles that have microcategory weights. The user's microcategory weights may define the user's affinity for certain movies and certain types of movies. The user's microcategory weights may be used to capture the user's preferences and may be updated based on the user's actions within the movie browser.

The browser user interface may allow a user to browse through movies by viewing several microcategories at once.

In some embodiments, a main or highlighted microcategory may be presented so that a user may scan through different movies within the highlighted microcategory. Many embodiments may also allow a user to select different microcategories and browse within those different microcategories.

In many embodiments, a user may be able to view details of specific movies. Such details may include the actors, director, plot line, reviews from friends or other people. In some cases, the movie's microcategories and the microcategory weights may be displayed in some fashion. The microcategories may be displayed as interactive buttons or links which may browse to that microcategory or show movies that are members or representatives of the microcategory.

The displayed microcategories may include both convergent and divergent microcategories. Convergent microcategories may be those that are strongly related to the user's preferences or recent selections. Divergent microcategories may be those that are not strongly related to the user's preferences or related selections. Convergent microcategories may be displayed to allow a user to drill deeper into a genre or to find more movies in a certain vein. Divergent microcategories may be those that are different from the user's strongest preferences and may allow the user to explore movies that are different from the user's strongest preferences.

When selecting the divergent microcategories, the system may select microcategories for which the user may have had some previous affinity in the past. Such microcategories may be lightly weighted and may be of some interest to the user, although not the strongest affinity.

In some embodiments, the system may select divergent microcategories for which the user may have no defined affinity. Such microcategories may be those which have never been viewed by the user.

Microcategories may be selected with a degree of randomization. For example, when selecting a divergent microcategory, the system may identify a group of divergent microcategories and select one or two of the microcategories at random. Similarly, the system may identify a group of convergent microcategories and select one or two of the microcategories at random.

The system may randomize the selection of movies to represent a specific microcategory. In one embodiment, the system may randomly select any movie associated with a microcategory with equal weighting. Other embodiments may randomly select a movie for a microcategory by weighting each movie with the movie's affinity to the microcategory when making the random selection. Such an embodiment may result in movies with a higher weighting for the microcategory to be selected more often than movies with a lower weighting.

The randomization may create a different browsing session each time.

In one use scenario, a user may sit down in the evening to watch a movie, but may not know which movie to watch. The user may activate the browser and may have an initial set of microcategories and associated movies presented on their television. The user may browse through movies in the displayed microcategories or may select more microcategories like any of the displayed microcategories.

During the browsing session, both convergent and divergent microcategories may be displayed, allowing the user to traverse the microcategories to browse different movies. In some embodiments, the divergent microcategories may be initially selected to be very broad and widely different from the user's main preferences, but may become more aligned with the user's preferences as the browsing session progresses.

A typical browsing session may begin with the user's general or long term preferences for movies. The long term preferences may be stored in the user's profile and may reflect the user's general tendencies or preferences. The preferences may be defined by microcategory weights that reflect the user's affinity for each of the weighted microcategories. During a browsing session, a separate set of weights may be defined as session weights.

The session weights may be updated with each interaction a user may make to the user interface. For example, a user's selection of a microcategory and viewing the details of movies in the microcategory may indicate the user's interest in the microcategory and related microcategories. Some embodiments may interpret different interactions with different weights. For example, a user who views the details of a movie, watches the associated movie trailer, and selects the movie to watch may have a much higher weight than an interaction where the user hovers over a movie for a period of time and views the details of the movie.

After completing a browsing session, the user's session weights may be merged into the user's long-term or profile weights. In some embodiments, each weight may be added to the user profile weights using some form of mathematical formula, such as exponentially weighted moving averages, or some other technique. Such embodiments may 'learn' or adapt to a user's preferences over time so that future browsing sessions may highlight types of movies that the user enjoys and provide a more tailored browsing experience.

Various embodiments may have different algorithms, heuristics, or mechanisms for calculating the weights within a user profile. In some embodiments, the weights may vary from 0 to 1, with zero indicating no affinity and 1 indicating the greatest affinity. Some embodiments may include negative weighting that indicates distaste or negative affinity to certain microcategories.

In some embodiments, a user profile may be initially seeded or started by having the user select favorite movies, or having the user rate several movies. Based on the initial ratings or selections, an initial microcategory weighting may be determined. As the user continues to browse and select movies over time, the user's profile may be further refined and improved. In some such embodiments, the user may be able to add to the profile by rating movies and giving feedback for movies that are viewed.

In other embodiments, the user profile may start out as a blank profile where no microcategory weights are present. In such embodiments, the user's interaction with the browsing system may be the sole or at least the major contributor to changes to the user profile.

The system of embodiment 100 is illustrated as being contained in a single device 102. The device 102 may have a hardware platform 104 and software components 106. The device 102 may perform both movie browsing and movie categorization, along with user profile management. In some embodiments, each of the various components of the system may be provided by a different hardware platform operating independently of each other.

The device 102 may represent a server or other powerful, dedicated computer system that may support multiple user sessions. In some embodiments, however, the device 102 may be any type of computing device, such as a personal computer, game console, cellular telephone, netbook computer, or other computing device. In some embodiments, device 102 may operate in a cloud computing environment and may have some or all of the various functions virtualized in various manners. Even in a cloud computing environment, a hardware fabric may be made up of multiple instances of the hardware platform 104.

The hardware platform 104 may include a processor 108, random access memory 110, and nonvolatile storage 112. The processor 108 may be a single microprocessor, multi-core processor, or a group of processors. The random access memory 110 may store executable code as well as data that may be immediately accessible to the processor 108, while the nonvolatile storage 112 may store executable code and data in a persistent state.

The hardware platform 104 may include user interface components 114, which may be monitors, keyboards, pointing devices, and other input and output devices. The hardware platform 104 may also include a network interface 116. The network interface 116 may include hardwired and wireless interfaces through which the device 102 may communicate with other devices.

The software components 106 may include an operating system 118 on which various applications may execute.

The device 102 may maintain a movie database 120 that has various movies that may be categorized using microcategories. The movie database 120 may also include various metadata about the movie, such as a brief description, actors and actresses, director, year of release, any awards garnered by the movie, or other information.

The microcategories may be detailed categories that may contain movies that have a certain theme or common element. In many embodiments, a single movie may be categorized into five, ten, or more microcategories. In some cases, a microcategory may be applied to a movie due to one specific scene or detailed element of the movie, so that the microcategories may reflect different elements of the movie.

The movie database 120 may apply weights for each microcategory assigned to a movie. For example, a movie that has a specific microcategory applied due to one sequence in the movie that represents ten percent of the movie may have a weight of ten percent applied to the microcategory. Other movies in the microcategory may have different weights due to more or less of the particular element of the microcategory.

In many cases, the microcategory descriptors may be descriptive enough to help a user browse for similar movies or movies having a particular theme. The themes may relate to the movie plot, styles, settings, actors and actresses, or any element of a movie.

A movie browser 122 may provide an interactive user interface for users to navigate the movie database 120. The movie browser 122 may be a user interface that may be presented on a user's television, computer, tablet, mobile telephone, or other device over a network connection.

The movie browser 122 may present various microcategories of movies and allow a user to browse through microcategories, view details of movies within the microcategories, and select a movie for viewing, purchase, or other use. Examples of such a movie browser may include embodiment 200 presented later in this specification.

The movie browser 122 may access a user database 124 that may contain user profiles. Each user profile may contain various weights for microcategories according to the user's tastes. The user profiles may be accessed by the movie browser 122 to use as a starting point for a browsing session. As the user interacts with the browser, the user profiles may be updated based on the user's actions and eventual selection of a movie. In some embodiments, the user may rate a movie after viewing, which may further update the user's profile in the user database 124.

A profile manager 125 may be an interface through which a user may establish, modify, and manage their user profiles. In some embodiments, the user may establish an account and may seed the account by answering some questions, rating movies, or otherwise giving input to profile manager 125. The user may be able to return to the profile manager 125 at various times and update information, change settings, or perform other maintenance to the user account.

A movie categorizer 126 may be a mechanism by which a movie expert may assign microcategories to various movies. In many embodiments, the microcategories may be assigned by an expert or groups of experts that have a background or interest in movies. When experts are used, the experts may be permitted to add, delete, or modify the various microcategories defined in a microcategory taxonomy 127.

In some embodiments, users may be able to update the movie database and may or may not be able to modify or add to the microcategory taxonomy 127. In some embodiments, all movie classification may be performed by experts and a casual user may not be able to create or modify microcategories or the movies assigned to the microcategories.

When general users are permitted to modify the categorization of movies, some embodiments may create separate microcategories just for each user. Such microcategories may or may not be shared with other users. In some such embodiments, some users' microcategories may be shared after review and approval by experts or content monitors.

The device 102 may be accessed over a network 128, which may include a wide area network such as the Internet. In some cases, some or all of the network 128 may be wired or wireless.

After browsing the movie database, a movie browser 122 may be used to view, purchase, or otherwise interact with a movie. In some embodiments, a movie viewing system 130 may stream movies over the network 128 to the user's device. In other embodiments, a movie retail sales system 138 may allow a user to purchase tickets to a movie or purchase a recording of a movie.

The movie viewing system 130 may contain a hardware platform 132. The hardware platform 132 may be similar to hardware platform 104, and may include a movie playback system 134 that may stream movies from a movie repository 136. The movie viewing system 130 may stream movies over the network 128 so that the movie may be viewed in real time or captured on the user's device and replayed at a later time. In some embodiments, the movie viewing system 130 may include digital rights management systems or other mechanisms to limit the user's ability to copy, use, or retransmit the movie.

The movie retail sales system 138 may be a website or other system through which a user may purchase a movie, such as a prerecorded movie or tickets to view a movie at a theater. In some cases, the movie retail sales system 138 may loan, lease, or rent a prerecorded copy of a movie for a limited time or a limited number of viewings.

Both the movie retail sales system 138 and movie viewing system 130 represent an end result of a movie browser session. The movie browser 122 may present a user interface through which the various microcategories may be presented so that the user may find a movie to watch or purchase. When the movie is eventually selected, the movie browser 122 may update the user's profile in the user database 124.

The movie browser 122 may present a user interface using several different client devices. As examples, one embodiment may use a set top box 140 as a device that communicates with the movie browser 122 to display a user interface on a television. In another example, a gaming console 144 may perform a similar function using a television 146. A personal computer 148, mobile device 150, or other client device 152 may also be used.

In some embodiments, the various client devices may store a movie for later viewing. In such embodiments, a user may browse movies using the movie browser 122 and a selected movie may be downloaded to the client device for viewing at a later time.

Figure 2:
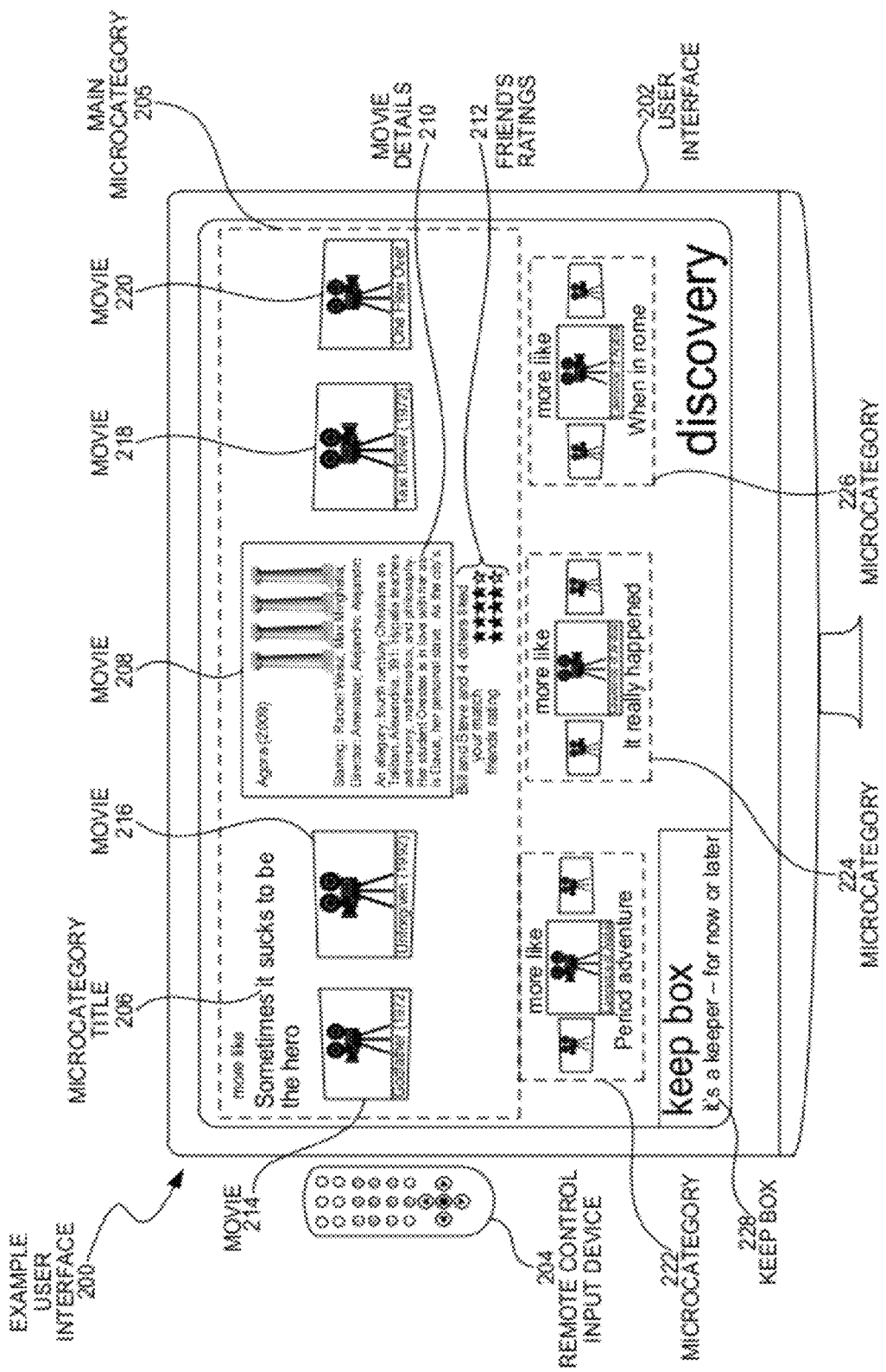
FIG. 2 is a diagram of an example embodiment showing a sample user interface for browsing movies.

FIG. 2 is a diagram illustration of an example embodiment 200 showing a user interface 202. Embodiment 200 may illustrate an example embodiment of an interactive user interface that may be displayed on a television, personal computer, mobile device, or other client device.

Embodiment 200 illustrates an interactive user interface that may be displayed on a television and operated using a remote control input device 204.

The user interface 202 may present a main microcategory 205 that may be the currently selected microcategory. The main microcategory name 206 is "Sometimes it sucks to be the hero". Within the main microcategory 205, a movie 208 is highlighted. Movie 208 may be displayed with movie details 210 and friend's ratings 212.

The main microcategory 205 may also display movies 214, 216, 218, and 220.

Within the main microcategory 205, a user may be able to scroll left or right to bring various movies into the center location. At the center location, the details of a specific movie may be displayed.

Also displayed on the user interface 202 are several other microcategories 222, 224, and 226. The other microcategories may include convergent microcategories that are similar to the currently selected main microcategory 205, as well as divergent microcategories that are different from the main microcategory 205.

In some embodiments, a keep box 228 may be a place where the user may save movies that may be interesting. The user may be able to navigate to the keep box 228 and browse through movies that have been previously stored.

In some embodiments, a user interface 202 may begin a browsing session by highlighting a microcategory that is related to the user's recent selections or the user's overall preferences. In some embodiments, the user may be able to search for a specific movie or genre as a starting point for a browsing session.

While the user interface is being displayed, the user may scroll sideways to view additional movies within the selected microcategory. Each movie displayed on the user interface may include a still or video image of the movie, along with a title or other information about the movie. In some embodiments, the user may be able to cause a movie trailer to be played for a selected movie.

The user may be able to scroll up and down to select different microcategories. When a microcategory is selected, the user may be able to scroll sideways to view the movies associated with the microcategory.

In many embodiments, the movies selected to represent a microcategory may be randomly chosen each time the microcategory is displayed. Such embodiments may cause different movies to be displayed each time the microcategory is displayed, which may cause the user to be more interested in exploring the various microcategories.

Figure 3:
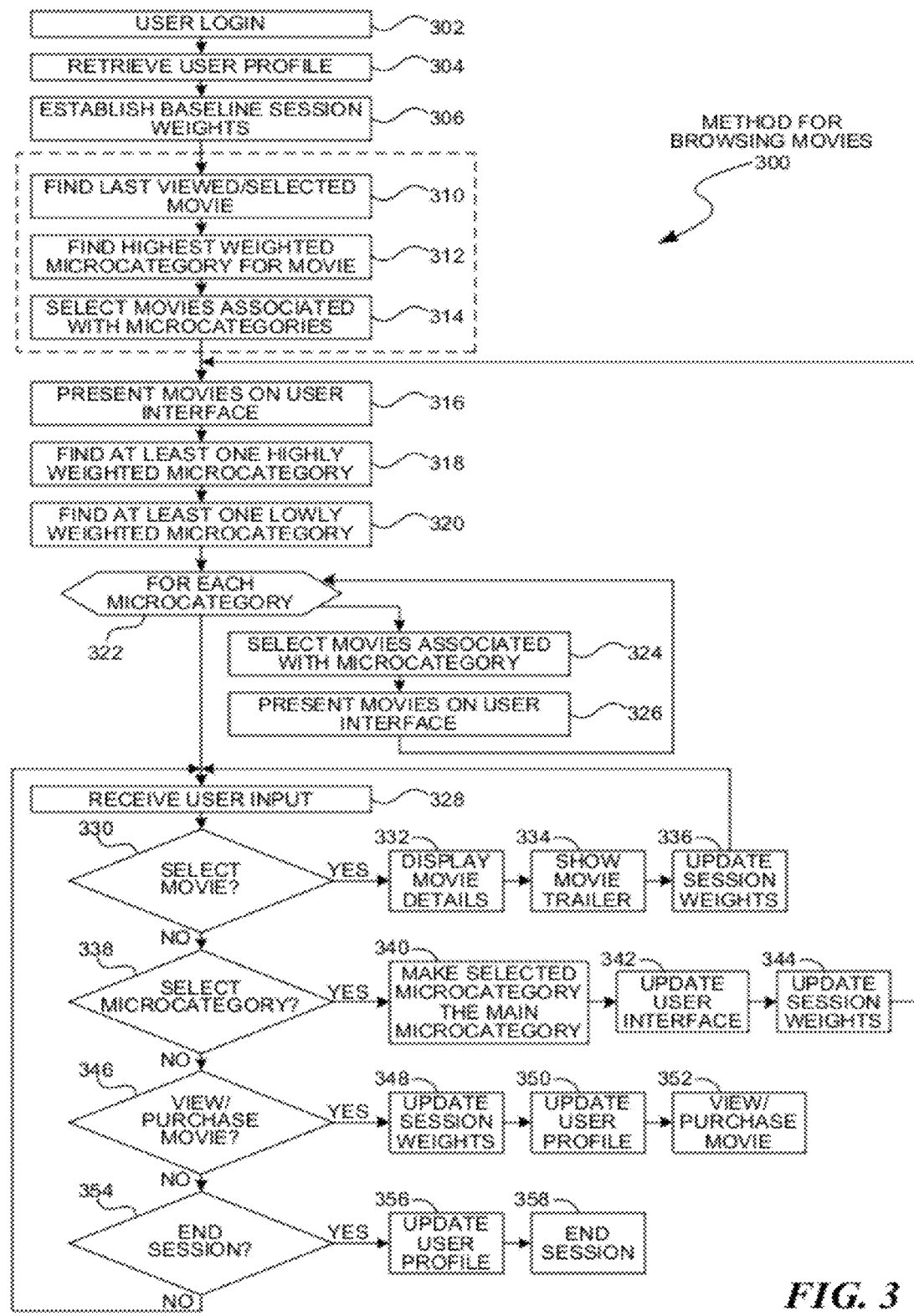
FIG. 3 is a flowchart of an embodiment showing a method for browsing movies.

FIG. 3 is a flowchart illustration of an embodiment 300 showing a method for browsing movies. Embodiment 300 is a simplified example of a method that may be performed by an interactive user interface for a movie browser.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

A user may login in block 302 and the user's profile and identifier may be retrieved from a user database in block 304. From the user profile, a set of baseline session weights may be established in block 306.

The baseline session weights may include weights for various microcategories that are retrieved from the user profile. The session weights may be modified throughout the browsing session and may be used to later update the stored user profile. Each weight may indicate the degree of affinity that the user may have for specific microcategories.

Based on the user profile, an initial set of movies may be determined in block 308. The initial set of movies may be determined by analyzing the last viewed or selected movie in block 310 and finding the highest weighted microcategory for that movie in block 312. From that microcategory, movies may be selected in block 314 for display.

The selected movies in the highlighted microcategory may be rendered on the user interface in block 316.

In block 318, at least one highly weighted microcategory may be identified and in block 320, at least one lowly weighted microcategory may be identified. The highly weighted microcategory may be one which is very similar to the main or highlighted microcategory and may be considered a convergent microcategory. Conversely, the lowly weighted microcategory may be one which is very different to the main microcategory and may be considered a divergent microcategory.

For each of the microcategories in block 322, movies associated with the microcategory may be selected in block 324 and rendered on the user interface in block 326. At this point, the user interface may be presented to the user and the user may perform some browsing action.

The user input may be received in block 328.

If the input is to select a movie in block 330, the movie details may be displayed in block 332, a movie trailer may be displayed in block 334, and the session weights may be updated to reflect the user's interest in the currently selected movie in block 336. The process may return to block 328 to receive a new input.

If the user input is to select one of the various microcategories in block 338, the selected microcategory may be made the highlighted or main microcategory in the user interface in block 340. The user interface may be updated in block 342 and the session weights may be updated in block 344. The process may return to block 316 to display the selected microcategory as the main microcategory and to select additional microcategories to display.

If the user input is to purchase or view the selected movie in block 346, the session weights may be updated in block 348 and the user profile may be updated in block 350. The user interface may be changed so that the user may purchase or view the movie in block 352. The process may then end.

If the user input is to end the session in block 354, the user profile may be updated in block 356 with any session information, and the session may end in block 358.

Figure 4:
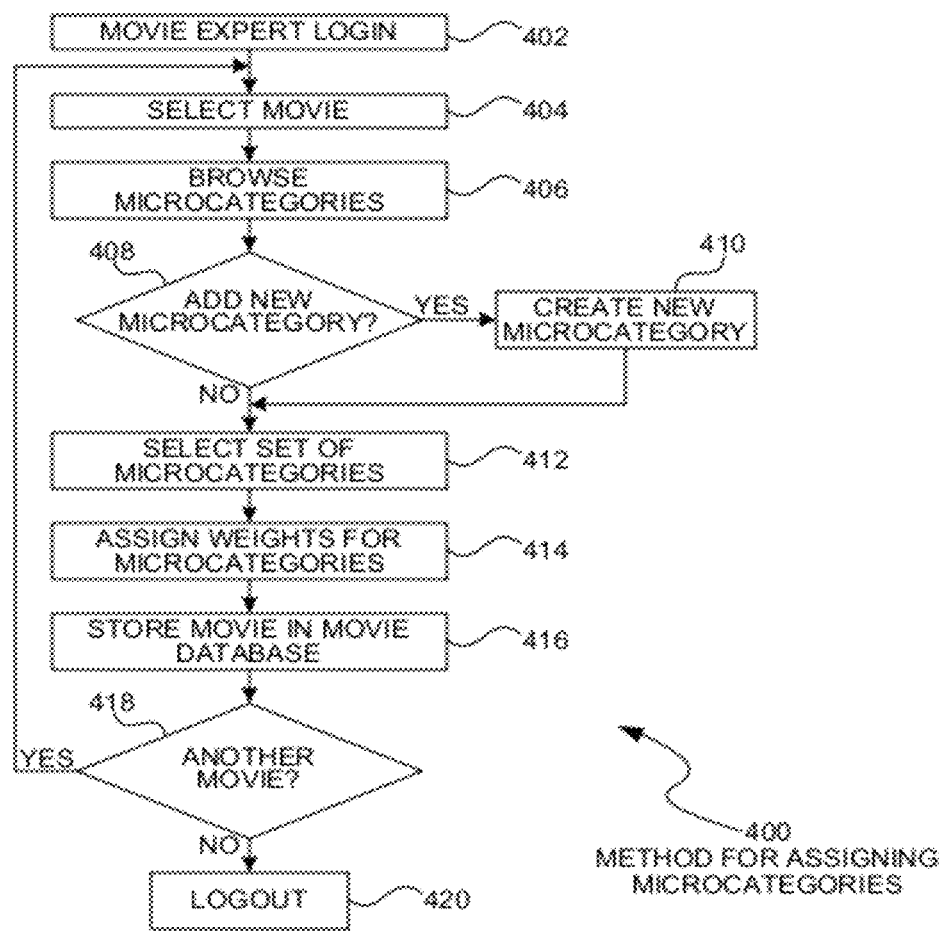
FIG. 4 is a flowchart of an embodiment showing a method for categorizing movies.

FIG. 4 is a flowchart illustration of an embodiment 400 showing a method for assigning microcategories to movies. Embodiment 400 is a simplified example of a method that may be performed by a movie expert to categorize movies into micro categories.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

In block 402, an expert may login to the system.

In block 404, the expert may select a movie. The expert may then browse the microcategories in block 406 in order to find those that characterize the movie. If a new microcategory is to be added in block 408, the new microcategory may be added in block 410.

The set of microcategories that the current movie fits are selected in block 412. In many cases, a single movie may fit five, ten, or even more microcategories.

In block 414, the expert may assign weights to each of the microcategories. The weights may indicate the affinity or degree of correlation between the movie and the various micro categories.

The movie may be stored in the movie database in block 416. If additional movies are to be categorized in block 418, the process may return to block 404. If no additional movies are to be categorized in block 418, the session may end by logging out in block 420.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A system comprising:
at least one processor;
at least one first computer storage medium configured to store a movie database comprising a plurality of microcategories assigned to each movie in said movie database;
at least one second computer storage medium configured to store a user database comprising user profiles, each of said user profiles comprising microcategory weights corresponding to said plurality of microcategories;
an interactive browser that:
  determines, via one or more of the at least one processors, an initial set of movies using a user profile for a first user;
  presents a plurality of microcategories on a user interface, each of said microcategories comprising a plurality of movies;
  receives input from a user to select one of said microcategories;
  updates a session profile comprising said microcategory weights based on said input, including updating session weights included in the session profile based on interactions with the interactive browser that are received from a user during an interactive browser session, with updated values of the session weights determined in accordance with different interaction types, the updated values of the session weights indicating different types of interactions with the interactive browser that are received from the user;

updates said plurality of microcategories on said user interface; and initiates merging of each of the session weights into corresponding ones of the plurality of microcategory weights included in the each of said user profiles that is associated with the interactions of the user, the merging performed using, at least, exponentially weighted moving averages, upon completion of an interactive browser session associated with the session profile, at least one of the interaction types including a user selection of a movie.

2. The system of claim 1, said plurality of microcategories comprising a highly weighted microcategory and a lightly weighted microcategory.

3. The system of claim 2, said highly weighted microcategory representing a microcategory having a high affinity with a user's previous selections.

4. The system of claim 2, said lightly weighted microcategory representing a microcategory having a low affinity with a user's previous selections.

5. The system of claim 2, wherein said interactive browser further:
receives a movie selection from said user and updates said user profile based on said session profile.

6. The system of claim 5, wherein said interactive browser further:
presents at least three movies in each of said microcategories on said user interface.

7. The system of claim 6, wherein said interactive browser further:
has a mechanism to view details about one of said movies.

8. The system of claim 7, wherein said interactive browser further:
has a mechanism to view a trailer for at least one of said movies.

9. The system of claim 2, wherein the different interaction types include one or more of:
a first interaction type associated with a first interaction that includes viewing the details of a first movie, watching a movie trailer associated with the first movie, and selecting the first movie, or
a second interaction type associated with a second interaction that includes hovering over a second movie for a period of time and viewing the details of the second movie.

10. The system of claim 9, wherein said interactive browser weights a first type of interaction higher than a second type of interaction.

11. The system of claim 1, said movie database comprising on average at least 5 microcategory classifications for each of said movies.

12. The system of claim 11, said movie database comprising on average at least 10 microcategory classifications for each of said movies.

13. A method comprising:
receiving a user identifier;
looking up said user identifier in a user profile database comprising user profiles, each of said user profiles comprising a plurality of microcategory weights;
determining a browsing starting point comprising a first microcategory;
accessing a movie database comprising a plurality of movies organized by microcategories;
determining at least two additional microcategories;
presenting said first microcategory and said at least two additional microcategories on a user interface;
for each of said microcategories, presenting at least one movie associated with said microcategories on said user interface;
receiving a set of session weights upon completion of a browser session, the session weights updated during the browser session based on interactions with an interactive browser that are received from a user, at least one of the interactions including a user selection of a movie; and
merging each of the received session weights in the set of session weights into corresponding ones of the plurality of microcategory weights included in the each of said user profiles that is associated with the interactions of the user, the merging performed using, at least, exponentially weighted moving averages.

14. The method of claim 13, at least one of said at least two additional microcategories being a microcategory having a low affinity with said user profile.

15. The method of claim 14 further comprising:
receiving an input from a user selecting a second microcategory, said first microcategory being one of said at least two additional microcategories; and
replacing said first microcategory with said second microcategory on said user interface.

16. The method of claim 15 further comprising:
receiving a selection identifying a movie from said user interface and displaying information about said movie on said user interface.

17. The method of claim 16 further comprising:
causing at least a portion of said movie to be displayed on said user interface.

18. A system comprising:
at least one processor;
at least one first computer storage medium configured to store a movie database comprising a plurality of movies, each of said movies being categorized into a plurality of microcategories;
a movie categorizer comprising a first user interface through which an expert identifies a movie and categorizes said movie using said microcategories;
at least one second computer storage medium configured to store a user database comprising user profiles, each of said user profiles comprising microcategory weights associated with said plurality of microcategories;
a movie browser comprising a second user interface through which a user browses movies arranged by said microcategories, said movie browser that:
determines, via one or more of the at least one processors, an initial set of movies using a user profile for a first user, said initial set of movies being members of a first microcategory;
identifies a plurality of additional microcategories;
for each of said additional microcategories and said first microcategory, identifies a plurality of movies within the microcategory and presents at least some of said plurality of movies as part of said microcategory;
receives input from a user to select one of said additional microcategories;
updates said second user interface to highlight said one of said additional microcategories;
selects a second set of additional microcategories to display on said second user interface;
updates a session profile comprising said microcategory weights based on said input, including updating session weights included in the session profile based on interactions with the movie browser that are received from the user, with updated values of the session weights determined in accordance with different interaction types that indicate different types of interactions with the movie browser that are received from the user; and initiates merging of each of the session weights in the set of session weights into corresponding ones of the plurality of microcategory weights included in the each of said user profiles that is associated with the interactions of the user, upon completion of a movie browser session associated with the session profile, the merging performed using, at least, exponentially weighted moving averages, at least one of the interaction types including a user selection of a movie.

19. The system of claim 18, said movie browser that further:

receives a selection from said user for a first movie;

determines a microcategory weighting for said first movie; and updates said microcategory weights for said user profile for said user using said microcategory weighting.

20. The system of claim 19, said movie browser that further:

updates said microcategory weights for said user profile for said user based on said input from said user.

* * * * *